United States Patent [19]

von Scheele

[11] 4,049,436
[45] Sept. 20, 1977

[54] BORON ALLOYED IRON POWDER FOR FILLER METALS

[75] Inventor: Gert H. von Scheele, Arild, Sweden

[73] Assignee: Hoganas AB, Hoganas, Sweden

[21] Appl. No.: 589,449

[22] Filed: June 23, 1975

[30] Foreign Application Priority Data

June 24, 1974 Sweden ............................ 7408230

[51] Int. Cl.² .................... C22C 33/02; C22C 38/32
[52] U.S. Cl. ................... 75/.5 R; 75/123 B; 228/165
[58] Field of Search .............. 75/.5 R, .5 BA, .5 AA, 75/123 B; 228/165

[56] References Cited

U.S. PATENT DOCUMENTS

| | | | |
|---|---|---|---|
| 3,212,876 | 10/1965 | Hulthén | 75/.5 BA |
| 3,511,646 | 5/1970 | von Scheele et al. | 75/.5 BA |
| 3,725,142 | 4/1973 | Huseby | 75/.5 BA |
| 3,764,295 | 10/1973 | Lindskog et al. | 75/.5 BA |

*Primary Examiner*—W. Stallard
*Attorney, Agent, or Firm*—Gust, Irish, Jeffers & Rickert

[57] ABSTRACT

An alloying element in the form of metal powder as a part of the flux composition with regard to nucleation agents and/or nitrogen binding elements and strong deoxidizers alloyed iron powder where the alloying content exists in an essentially more diluted state than hitherto has been used in the commercially available alloying metals wherein a practical application of the micro alloying technique is possible, which is used when producing fine-grained steels, also for a reproducible production of filler metal by using an iron based powder either in the as condition or diluted with a boron free unalloyed iron powder as a raw material in the production of filler metals such as stick electrodes, agglomerated fluxes, flux cored wires, in that it contains boron within the limits 0.005% and 0.5%.

8 Claims, 5 Drawing Figures

BORON ALLOYED IRON POWDER FOR FILLER METALS

BACKGROUND OF THE INVENTION

1. Field of the Invention

The interest to use so-called high strength steels and fine-grained steels in the shipyard industries, in pressure vessels and machine constructions has increased very much during the years. Many of the metallurgical and welding technical problems and questions which have come up have been solved or are theoretically solved. For the moment the development work within the above-mentioned welding areas is focused partly to the question how to, through different welding methods and the choice of welding parameters, prevent that hard, brittle and crack sensitive zones appear in the heat affected zone as a consequence of heat generated during the process and partly to the development of filler metals which give weld deposits combining the wishes of high yield strengths and tensile strengths with high demands on the toughness. Especially the fulfillment of the specifications of the toughness demands at low temperatures causes great problems.

2. Description of the Prior Art

In steel production minor additions of elements as Al, Ti, Nb, V, B, Zr etc., which contribute to make a more fine-grained microstructure of the steel plate material and thus increase the yield and tensile strengths combined with improved toughness more and more have been used for the so-called fine-grained steels with hield strengths > 36 kp/mm$^2$ and tensile strengths up to 100 kp/mm$^2$. Such elements make the steel plates more resistant to the influence of welding heat input — slower to transform — which from the weldability point of view is important. The necessary level of alloying elements earlier used in conventional steels in order to increase the strengths such as carbon, Cr, Mo, Ni etc. has hereby been lowered, which has contributed to further improve the weldability. Considering the toughness qualities and the crack resistance of the weld deposit the limitation of the carbon content of the steel plates is in this case especially valuable as high carbon contents in the weld deposit may cause hot cracking and deteriorates the obtaining of good impact properties. In connection with this it should be pointed out that in most welding processes the dilution of base metal is at least 25%.

In spite of the above-mentioned improvements the use of the high strength steels however still causes a lot of welding problems, which demand necessary considerations to the realization of the welding not necessary when using conventional steels. By different heat treatments before and/or after welding satisfactory weld joints can certainly be achieved but practical, technical and, above all economical aspects prevent such solutions of the complex problems. The use of high strength steels is therefore still rather small.

SUMMARY OF THE INVENTION

With regard to the high demands on the impact strength of the weld deposit when welding such steels only welding methods are of immediate interest, where flux compositions, with the mixing of besides flux also other slag formers and the metal powders in question etc., are included as a part of the filler metal. These methods are submerged arc welding, flux cored wires and coated stick electrodes. The last method has to be considered as the most reliable. With regard to the problem of the heat affected zone only filler metals giving the weld deposit a low hydrogen content can be used, i.e., the flux composition must be of the so-called basic type.

It is known that a well balanced level of in the weld deposit occurring contents of C, Si and Mn, low contents of impurities concerning S and P and low contents of nitrogen and oxygen is a pre-requisite condition to obtain satisfying impact properties at low temperatures. As an often applied rule the Si content ought to be limited to max. 0.30%, the Mn content to 0.80–1.30% according to the desired tensile strength level, while the carbon content, especially at basic filler metals ought to be kept as low as possible as well as the S and P contents.

It is further known that the best impact strengths can be obtained when welding stringer beads than weaved. The reason for this is that the amount of so-called primary structure of the welding structure in the first mentioned case will be less, and the amount of fine-grained so-called weld normalized structure greater. Considering the productivity of the welding it is of course advantageous if the welding can be made with as few passes as possible. At high productivity — i.e. welding with high current intensity, few and thick weld beads and slow cooling rate — the dendrites of the primary structure will however inevitably automatically be thick and the degree of segregation in the weld deposit high, which among other things cause poorer impact strength. A special pronounced and coarse-grained dendritical primary structure is obtained at electroslag welding or welding of a coarse plate in a single weld bead by submerged arc welding from one side. See Example 4. The amount of coarse primary structure and therewith connecting difficulties to fulfill the standards of impact strength also exist when welding with flux cored wire or stick electrodes vertically up.

In order to achieve optimum air protection thus eliminating the harmful effect of air entering the weld pool a suitable flux composition must be formulated. It is further known that a smaller addition of stronger deoxidizers and elements binding nitrogen to nitrides can strongly contribute to an improvement of the impact strength of a weld deposit. Some of these elements also act as nucleation agents through which a more fine-grained and ductile primary structure can be achieved. Ti, Al, V, B, Mo, Zr etc. are examples of known deoxidizers, nucleation agents and nitrogen binding elements which here may be taken into consideraion.

Although the mechanism of these elements' behavior in molten and solidified condition in the weld in all essentials is known as well as the limits within which a favorable effect of these elements can be obtained, the use of them still causes great difficulties in industrial production of filler metals concerning the reproducibility. It is for example well known that a comparable small enrichment of such elements locally appearing in the weld deposit causes a decreased toughness or even crack formation.

Because the combined addition of the above-mentioned nucleation agent and strong deoxidizers often is limited to 0.5% of the total weight of the flux composition, which at one and the same mixing operation usually is about 100–2000 kg, great practical problems occur to guarantee a homogeneous mixing. Nucleation agents has yet only been used to limited extent in the production of filler metals. Up till now more insensible deoxidizers have dominated like Si and Mn, which however do not give the desired refinement of the primary structure.

It is known that boron is the most effective nucleation agent of the above-mentioned regarding the ability to attain a fine-grained primary structure. While for example a favorable effect of Al, Ti, Zr, V on impact strength of the weld deposit can be reached with contents between 0.01 and 0.03%, the corresponding favorable area when using boron is as low as between 0.002 and 0.005% according to known observations and the innovator's own experiments according to the following. These nucleation agents occur commercially as a rule as pure metals or relatively high percentage (5% or essentially higher) complex alloys. The latter can also contain considerable amounts of undesired elements or desired elements in too a high extent to be used as filler metals. The specification limits for sieve analysis, density, particle size and chemical analysis for the commercially available powder alloying elements are besides often too wide regarding the practical problems when using them, which partly cause difficulties to make a homogeneous admixture, partly cause risks for great variations of the metal yield during welding. Even if a satisfying admixture can be provided out of these views the handling of the ready powder mix in dry state can cause segregation and inhomogeneity. A way to partly overcome this problem is to agglomerate the content of the flux composition with water glass and wet mix the compound, which usually is not applied at the manufacturing of flux cored wire, and which moreover cause the need for drying the flux composition at high temperatures, when the oxidation of the deoxidizers is another occurring problem.

DETAILED DESCRIPTION

Figure 1:
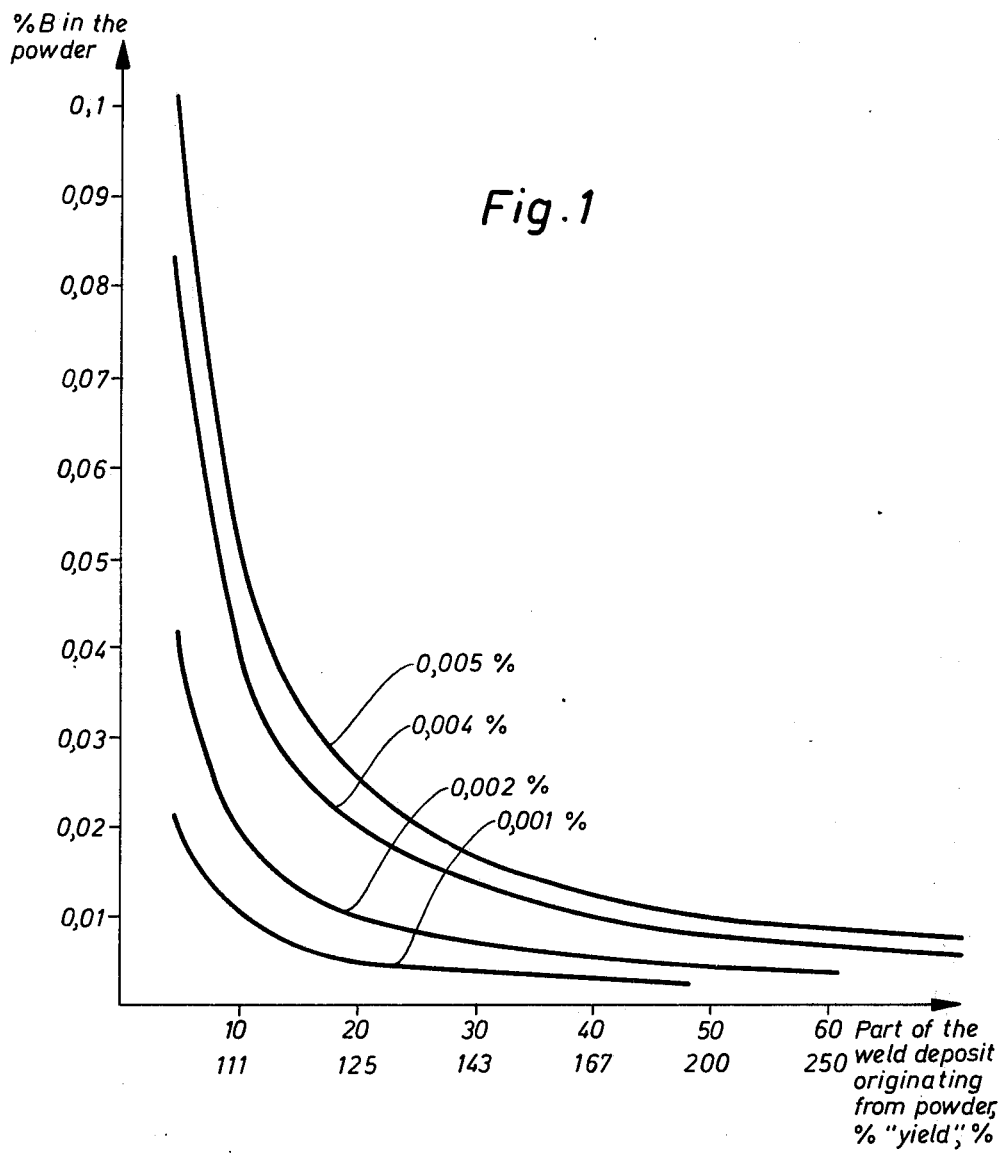
FIG. 1 is a graph illustrating the boron content of the iron powder as a function of the part of the weld deposit originating from the powder.

The basic thought of this invention is to add a new alloying element in the form of metal powder as a part of the flux composition (with regard to nucleation agents and/or nitrogen binding elements and strong deoxidizers alloyed iron powder) where the alloying content exists in an essentially more diluted state than hitherto has been used in the commercially available alloying metals. By this the above-mentioned problems are eliminated and a practical application of the micro alloying technique is possible, which is used when producing fine-grained steels, also for a reproducible production of filler metal.

Iron powder has successively been one of the most dominating raw materials for flux provided filler metals. Iron powder additions in e.g. the coating of stick electrodes contribute to improve the welding properties, increase the current carrying capacity and consequently the welding speed. In certain cases the welding speed can be doubled by the iron powder addition in comparison with a corresponding electrode without iron powder in the coating of a maintained or improved quality in the weld deposit. The iron powders produced for the purpose for the time being and especially the ones produced by reduction of iron ore concentrate are characterized by particularly low impurity contents and narrowed specification limits with regard to chemical composition and physical properties and thus well suited as a raw material for production of different filler metals. When necessary such iron powders can also be produced with very low carbon contents (max. 0.02%), which is of primary importance regarding the impact strength in the weld deposit of basic filler metal used for high strength steels.

Indirectly the iron powder additions further contribute to a lowered carbon content in the weld deposit by that they diminish the penetration and the dilution of the base plate material, the carbon content usually being between 0.15 and 0.22% at high strength steels. The lower impurity contents in such iron powders in comparison to the base plate material the wires and the strips often used in filler metals contribute furthermore to improve the weld quality.

When adding the alloying elements of the type nucleation agent to the flux composition according to the basic thought of the innovation an even distribution of the alloying content in the filler metal thus also in the weld deposit, can be guaranteed and the otherwise acute risk of enrichment and lowering of the impact strength or crack formation can be considerably reduced.

The possibilities for an even distribution of the alloying elements increase proportionally to the content of the above-mentioned new alloying elements in the filler metal. The alloying elements are most even distributed when all iron powder used in the filler metal is alloyed with the mentioned alloying elements.

The use of e.g. boron as a nucleation agent, where a favorable effect of the quality of the weld deposit according to the above can only be obtained as boron contents in the weld deposit between 0.002 and 0.005%, thus presuming an especially great precision and reproducbility at the production of these filler metals. It is quite natural that such a precision and reproducibility is nearly impossible to achieve during practical production conditions, if one as boron bearer uses e.g. powder ferro-boron, which usually is marketed with a boron specification of 18–22%, B, i.e. partly with too wide specification limits regarding the need, partly with too high a concentration of boron in the alloying element. As boron bearer other complexly combined powder alloying elements certainly occur, e.g. aluminum-vanadium-B (specification 40–45% V, 7–9% B, 2–2.5% Al or aluminum-boron with the specification 1–2% B, rest Al) exhibiting lower boron contents but at the same time containing strong deoxidizers or not desirable elements in so high a concentration that the use is impossible.

In modern so-called high yield electrodes with yield values between 160 and 250% (in the following called "yields") counted on the weight of molten core wire, the iron powder addition amounts for example to between 55 and 70% of the weight of the flux composition. Some marketed flux compositions for submerged arc welding of so-called high yield type contain an iron powder content amounting to 55% and for flux cored wires the iron powder content can amount to 80%. Because iron powder in considerable quantities thus can occur as admixed raw material in all the actual filler metals when welding high strength steels, it is hereby offered when using metal powder according to this innovation the possibilities to admix nucleation agents and/or strong deoxidizers, nitrogen binding elements with an essentially better precision and evenness than hitherto when using conventional powder alloying elements.

An alternative to add the desired alloying elements in suitable amounts to the weld through the flux composition is to use alloyed welding wires with nucleation agents. The great flexibility needs of the producer of filler metals regarding the possibilities to produce filler metals with many different compositions limit this possibility. The production of such wires or strips for flux cored wires with a required efficient precision for the need regarding the alloying content is besides a well known problem. It is known that the drawing of especially boron alloyed wires at the boron content of 0.005% to small dimensions is another intricate technical and economic problem. The alloying of nucleation agents etc. in small quantities through the flux to the weld is therefore a more realistic alternative despite the occurring mixing problems but which by the use of the innovation considerably have been reduced.

At normally occurring welding methods 5–70% of the weld deposit originates from the metal powder in the flux composition, and therefore it is not possible to state a fixed composition of the powder mix according to the innovation. The highest and lowest values of the boron content in the flux composition can however be calculated and are stated in the following examples.

EXAMPLE 1

Suppose that Z% of the weld deposit originates from the metal powder of the flux composition and that the boron content of the weld deposit aimed at is B%. The boron content that the flux composition then should have is $x$ %. A hundred percent yield of boron is assumed. Then the following connection between Z and $x$ exists:

$$Z/100 \cdot X/100 = B/100; \quad x = B \cdot 100/z$$

From the result above curves can be constructed, which give the boron content of the iron powder as a function of the part of the weld deposit originating from the powder, for some cases with different boron content in the weld metal.

FIG. 1 shows a group of such curves, the x-axes being divided in both "part of the weld deposit originating from powder" and the so-called "yield".

In the following examples some experiments will be described, which are performed in order to show the advantages of the innovation according to this application.

EXAMPLE 2

Basic stick electrodes according to ISO:E 445 B26 and AWS/ASTM E 7018 respectively with the diameter of 4 mm and yield of 125% were made with a coating containing flux, deoxidizers and sponge iron powder. The particle size of the iron powder was less than 417 um, its H$_2$-loss according to MPIF standard 2–48 0.4% and its carbon content 0.03%.

Welding was performed both horizontally and vertically up with the following parameters: Direct current + pol, 170 ampere, and thereafter test bars for Charpy V-notch impact test were selected according to ISO standard 2560-1973 (E).

The following table listed below gives the impact strength results at various temperatures. Impact strength in Joule, mean values:

| Temperature | Horizontally welded | Vertically welded |
|---|---|---|
| +20° C | 169 | 112 |
| ±0° C | 125 | 89 |
| −20° C | 92 | 58 |
| −40° C | 42 | 20 |

Stick electrodes were made which were identical with the above described electrodes with the exception that boron alloyed iron powder instead of the unalloyed iron powder was used. The boron content of the powder was 0.023%.

Welding horizontally and vertically up in exactly the same way as described above gave the following impact strengths. The boron content of the weld deposit was 0.0031% and 0.0022% respectively. Impact strenght in Joule, mean value:

| Temperature | Horizontally welded | Vertically welded |
|---|---|---|
| +20° C | 186 | 153 |
| ±0° C | 171 | 137 |
| −20° C | 147 | 109 |
| −40° C | 121 | 54 |
| −60° C | 54 | |

The example above clearly shows the advantage of alloying boron to the weld deposit according to this application, giving higher impact values, which are achieved through the boron addition. For making the iron powder with this very low boron content according to the innovation some of the alloying methods known in powder metallurgy can be used. Such methods are atomizing, diffusion alloying, mechanical alloying; see for instance "Alloying practice in the production of sintered steels by P. Lindskog and G. Skoglund."

Swedish Pat. No. 227.784 describes a welding technique called high deposition submerged arc welding with iron powder joint fill, flux and wire as filler material. The international standards regarding impact strength of the weld deposit of high strength steels which are valid at the time for this application, are so rigorous that they only in special cases are fulfilled and have therefore lowered the interest of this welding method. The following example however shows how a boron alloyed iron powder used in this welding technique improves the impact strength and then meets the international standards for the weld deposit of high strength steels.

EXAMPLE 3

Figure 2:
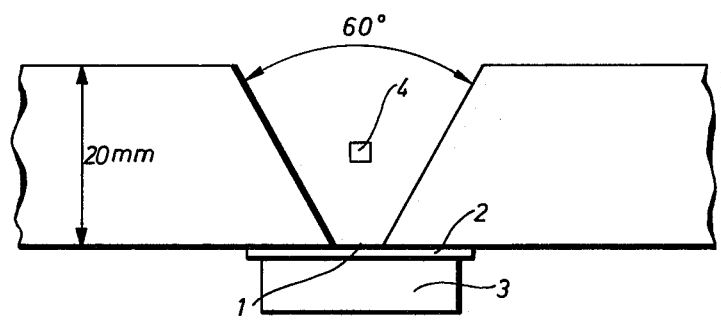
FIG. 2 shows the relationship of the glass fiber to the copper plate.

Manganese alloyed Wel Grit$^R$ powder containing 1.30% Mn, which is an iron powder having the particle size of 0.3–2 mm, was alloyed with boron in contents given in the table below. These powders were used in submerged arc welding of a 20 mm niobium alloyed fine-grain steel, the analysis of which was 1.33% Mn, 0.18% C, 0.44% Si, 0.026% Nb, 0.021% P, 0.016% S, 0.005% N, the remainder being iron. The welding was performed with a high basic agglomerated flux as a tandem welding in one pass against a copper glass fiber backing according to FIG. 2, in which 1 denotes a 5 mm opening, 2 a 2 mm cloth of glass fiber and 3 a copper plate of 8 mm width.

Welding parameters used:

Wire 1: 1150 A, 34 V, 34 m/h
Wire 2: 850 A, 40V, 34 m/h

The impact strength of the weld deposit is shown in the following table.

| Boron content of the iron powder, % | Boron content of the weld, % | Impact strength in Joule at different temperature, mean values: | | | |
|---|---|---|---|---|---|
| | | +20° C | +0° C | −20° C | −40° C |
| 0 | 0 | 82 | 53 | 8 | 17 |
| 0.009 | 0.0010 | 95 | 65 | 29 | 24 |
| 0.018 | 0.0012 | 98 | 62 | 23 | 21 |
| 0.035 | 0.0028 | 130 | 78 | 60 | 48 |
| 0.07 | 0.0041 | 93 | 80 | 55 | 42 |

The table shows an exceptionally strong increase of the impact strength, especially at low temperatures and with a boron content of 0.04–0.07% of the iron powder.

Earlier in this application the importance of the primary structure of the weld has been indicated. Its main character is the dendrites oriented normally to the solidification front, which in the latest solidified areas situated centrally in the weld are growing vertically to the steel plate surface. Further the impurity content is always highest in this area owing to segregation. These two facts together will always make the center of a weld the worst from the viewpoint of impact strength in unalloyed weld deposits the structure consists of ferrite and pearlite in the so-called Widmanstatten orientation with more or less long and coarse ferrite arms regarding the used flux, the chemical analysis of the weld deposit and the cooling rate at the solidification. In the case of the high deposition submerged arc welding with iron powder joint fill in heavy steel plates the cooling rate is of course always relatively low but yet higher when iron powder is used in the joint than with conventional submerged arc welding. In the last mentioned case the weld deposit in primary structure state shows without any exception very low impact strength. Mostly a one pass weld cannot even be accomplished without iron powder fill.

An effective way to essentially improve the impact strength of weld deposit is to create a more fine-grained primary structure in the weld deposit. Boron containing iron powder has shown to be an excellent tool to do this. The mechanism working when such a powder is used in submerged arc welding is that the borides work as nucleation agents of new primary crystals, whereby the number of crystals or dendrites get more and more fine-grained and a more ductile weld metal is achieved.

EXAMPLE 4

Figure 3:
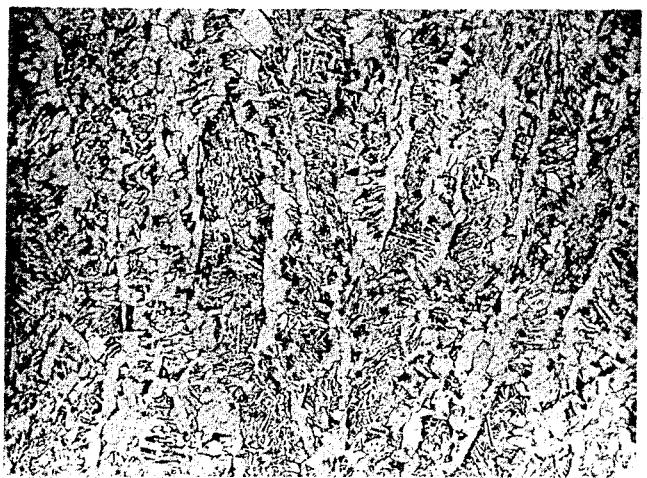
FIGS. 3 to 5 show the primary structure situated centrally in respective embodiments.
Figure 4:
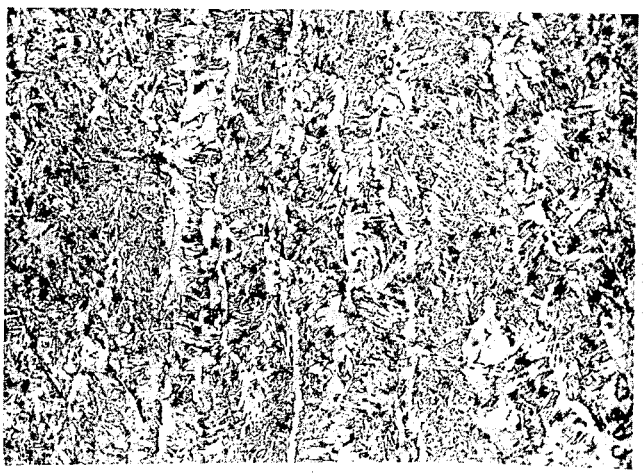
Figure 5:
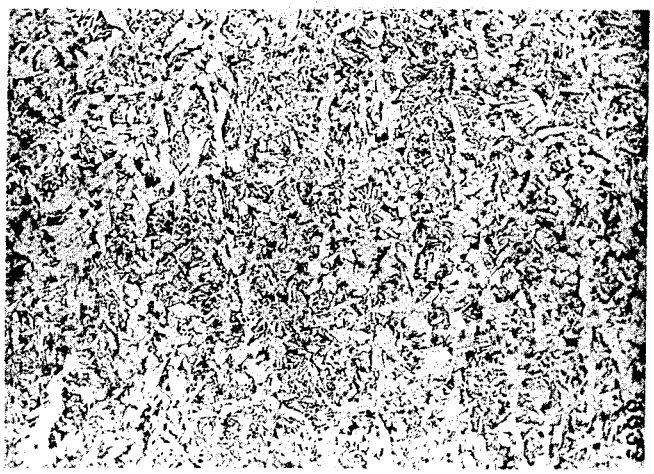

The primary structures of weld deposits with a boron content of 0%, 0.0018% and 0.0024% respectively originating from powder with different boron content have been examined microscopically. The welding method used was high deposition submerged arc welding with iron powder joint fill in a single pass. The result is shown in the FIGS. 3–5 respectively. They show the primary structure situated centrally in the weld deposit marked 4 in FIG. 2. From these the influence of the boron content on the primary structure is seen. It becomes more irregular with increasing boron content up to 0.0024%.

The flux used in the foregoing examples is one commercially available which gives the highest impact strength in conventional welding technique according to tests performed in the innovator's laboratory. Welding with a high basic agglomerated flux of another supplier normally gives very low impact strength. But with the use of a boron containing iron powder according to the innovation, higher impact values are achieved. This can be seen in the following example.

EXAMPLE 5

This is the same experiment as in Example 3 with the difference being another commercially available high basic agglomerated flux.

Result:

| Boron content of the iron powder, % | Impact strength in Joule at different temperatures, mean values | | | |
|---|---|---|---|---|
| | +20° C | +0° C | −20° C | −40° C |
| 0 | 32 | 26 | 15 | 8 |
| 0.035 | 92 | 73 | 55 | 58 |

The boron content of the weld deposit when the boron content of the iron powder was 0.035% was determined to be 0.0024%.

In order to further demonstrate the high impact values caused by the addition of boron to the iron powder, in connection with submerged arc welding experiments have been done with another iron powder.

EXAMPLE 6

A boron alloyed iron powder having a particle size less than 417 um (-35 mesh) has been used as the filler material in submerged arc welding according to what was described in Example 3. Impact strength values were determined and are shown in the following table.

| Boron content of the iron powder, % | Impact strength in Joule at different temperatures, mean values: | | | |
|---|---|---|---|---|
| | +20° C | +0° C | −20° C | −40° C |
| 0 | 63 | 27 | 12 | 7 |
| 0.035 | 125 | 111 | 62 | 17 |

If the powder according to the innovation is to be used in the existing condition as a raw material in the high yield the boron content ought to be very low. A boron content is low as 0.003% in the powder then can be of interest. However, a minimum boron content of 0.005% of the powder is more realistic. This corresponds, at a 100% boron yield and a welding yield of 170%, to a boron content of the weld deposit of about 0.002%, according to Example 1.

In the cases when a small part of the weld deposit originates from the iron powder the boron content should be considerably higher; a yield of 104% demands a boron content of about 0.05% in the iron powder in order to give the weld deposit a boron content of 0.002%. When the boron containing iron powder according to the innovation is to be diluted with a powder free from boron the boron content of the first mentioned powder must be raised to an extent corresponding to the dilution. In order not to loose the advantages lying in the idea of the innovation the boron content in the iron powder which is going to be mixed with the pure iron powder should not exceed 0.5%.

Further it has shown that in certain applications of this innovation elements such as Al, Ti, Zr, V in a total content of up to 1% is advantageous as is the case with the elements Ni, Cr, Mo in a total content of less than 20%.

I claim:

1. Iron based weld filler powder to be used either in the as condition or diluted with a boron free unalloyed iron powder as a raw material in the production of filler metals such as stick electrodes, agglomerated fluxes, flux cored wires, characterized in that it contains boron within the limits 0.03% and 0.07%.

2. Powder according to claim 1, characterized in that it further contains one or more of the elements Al, Ti, Zr, V in a total content of up to 1%.

3. Powder according to claim 1, characterized in that it contains one or more of the elements Ni, Cr, Mo in a total content of up to 20%.

4. The method of making a weld deposit comprising the steps of depositing an iron based powder having boron within the limits of 0.005% and 0.5% in a weld cavity between the two metal members; applying a welding action to said powder to form a high impact weld deposit between said two metal members.

5. The method of claim 4 characterized in that the weld powder further contains one or more of the elements Al, Ti, Zr, V in a total content of up to 1%.

6. The method of claim 4 characterized in that the weld powder contains one or more of the elements Ni, Cr, Mo, in a total content of up to 20%.

7. The method of making a weld deposit comprising the steps of depositing an iron based powder having boron within the limits of 0.03% and 0.07% in a weld cavity between the two metal members; applying a welding action to said powder to form a high impact weld deposit between said two metal members.

8. The method of making a weld deposit comprising the steps of depositing an iron based powder having boron within the limits of 0.005% and 0.5% diluted with a boron free unalloyed powder in a weld cavity between the two metal members; applying a welding action to said powder to form high impact weld deposit between said two metal members.

* * * * *

UNITED STATES PATENT AND TRADEMARK OFFICE
CERTIFICATE OF CORRECTION

PATENT NO. : 4,049,436
DATED : Sept. 20, 1977
INVENTOR(S) : Gert H. von Scheele

It is certified that error appears in the above-identified patent and that said Letters Patent are hereby corrected as shown below:

Col. 1, line 38, "strengths" should be -- strength --

Col. 3, line 46, "invention" should be -- innovation --

Col. 4, line 36, "as" should be -- at --

Col. 6, line 19, "strenght" should be -- strength --

Col. 7, line 16, "0.04-0.07%" should be --0.03-0.07% --

Col. 10, line 21 (Claim 8), "a" omitted between "form" and "high"

Signed and Sealed this

Twenty-fourth Day of January 1978

[SEAL]

Attest:

RUTH C. MASON
Attesting Officer

LUTRELLE F. PARKER
Acting Commissioner of Patents and Trademarks